(12) United States Patent
Allred

(10) Patent No.: US 11,641,859 B2
(45) Date of Patent: May 9, 2023

(54) ENHANCED YIELD IN NUT BEARING PLANTS

(71) Applicant: UPL CORPORATION LTD., Port Louis (MU)

(72) Inventor: Darin Allred, Sacramento, CA (US)

(73) Assignee: UPL CORPORATION LTD., Port Louis (MU)

( * ) Notice: Subject to any disclaimer, the term of this patent is extended or adjusted under 35 U.S.C. 154(b) by 394 days.

(21) Appl. No.: 16/277,421

(22) Filed: Feb. 15, 2019

(65) Prior Publication Data

US 2019/0254281 A1 Aug. 22, 2019

Related U.S. Application Data

(60) Provisional application No. 62/710,593, filed on Feb. 16, 2018.

(51) Int. Cl.

| *A01N 47/14* | (2006.01) |
|---|---|
| *A01N 59/20* | (2006.01) |
| *A01N 47/34* | (2006.01) |
| *A01N 59/16* | (2006.01) |
| *A01N 47/30* | (2006.01) |
| *A01N 43/653* | (2006.01) |

(52) U.S. Cl.
CPC ........... *A01N 47/30* (2013.01); *A01N 43/653* (2013.01); *A01N 47/14* (2013.01); *A01N 47/34* (2013.01); *A01N 59/20* (2013.01)

(58) Field of Classification Search
CPC combination set(s) only.
See application file for complete search history.

(56) References Cited

U.S. PATENT DOCUMENTS 6,242,385 B1 6/2001 Weiland et al.

FOREIGN PATENT DOCUMENTS

| GB | 1509195 A | 5/1978 |
| WO | 99/16316 A1 | 4/1999 |

OTHER PUBLICATIONS

"Walnuts in California" webpage on UC Davis Fruit & Nut Research & Information website [online], retrieved on (Jun. 18, 2021) from URL <http://fruitandnuteducation.ucdavis.edu/fruitnutproduction/Walnut/>.*
Dimilin label on EPA website [online], dated (Apr. 18, 2011), retrieved on (Jun. 19, 2021) from URL <https://www3.epa.gov/pesticides/chem_search/ppls/000400-00461-20110418.pdf>.*
Lang, Michael David. Epidemiology and management of Walnut blight in Tasmania. Diss. University of Tasmania, 2012.*
Ma, Zhonghua, et al. "Sensitivity of Botryosphaeria dothidea from California pistachio to tebuconazole." Crop Protection 21.9 (2002) : 829-835.*
Doll. D., "The seasonal patterns of almond production." Jun. 22, 2009. retrieved from the Internet <https://thealmonddoctor.com/the-seasonal-patterns-of-almond-production/>.*
UC IPM—Almond, "Why is the bloom stage important in an IPM Program?" (2016), retrieved from the Internet: < http://ipm.ucanr.edu/PMG/C003/m003bcwhybloom.html>.*
Mosz, N., "Walnut Timeline," National IPM Database, May 30, 2002, retrieved from the internet <https://ipmdata.ipmcenters.org/documents/timelines/CAwalnut.pdf >.*
Meier, D.J., "When it's all about walnut blight," FarmProgress, Jan. 31, 2018. [online]. Retrieved from: < https://www.farmprogress.com/tree-nuts/when-it-s-all-about-walnut-blight>.*
Dimlin 2L label, 2001. [online]. Retrieved from:<https://www3.epa.gov/pesticides/chem_search/ppls/000400-00461-20010108.pdf>.*
Patent Cooperation Treaty, International Search Report for PCT/US2019/018314, dated Apr. 29, 2019, pp. 1-4.
Ponder, Annual Applications of N, P and K for Four Years Moderately Increase Nut Production in Black Walnut, HortScience, Oct. 1, 1998, pp. 1011-1013.
Hendricks, A Comparison of Tebufenozide (Confirm), Diflubenzuron (Dimilin) Esfenvalerate (Asana) and Chlorpyrifos (Lorsban) for Control of Codling Moth, Cydia Pomonella in Walnut, Juglans Regia, Acta Horticulturae, Jan. 1, 2001, pp. 395-397, No. 544.
Zhang, Z. et al.; "New Agricultural Practical Technology"; Chinese Agricultural Science and Technology Press, first edition; 1995; p. 419.

* cited by examiner

*Primary Examiner* — John Pak
(74) *Attorney, Agent, or Firm* — Cantor Colburn LLP

(57) ABSTRACT

Disclosed is a method for promoting the yield of a nut-bearing plant, comprising contacting the nut-bearing plant or a part thereof with an effective amount of a compound of formula (I):

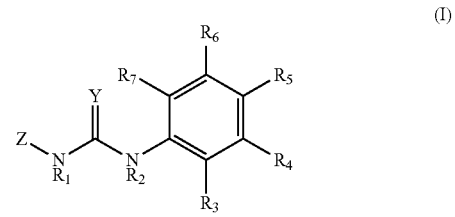

wherein the variables in Formula I are defined as described herein.

5 Claims, No Drawings

ENHANCED YIELD IN NUT BEARING PLANTS

RELATED APPLICATIONS

This application claims the benefit of U.S. Provisional Patent Application No. 62/710,593, filed Feb. 16, 2018, entitled ENHANCED YIELD IN NUT BEARING PLANTS. The entire contents of the foregoing application is incorporated herein by reference, including all text and tables.

INTRODUCTION

The present disclosure relates to methods for promoting the yield of nut-bearing plants. In particular, the embodiments relate to methods for enhancing nut yield of nut-bearing plants by contacting the plants between bud break and during early nut formation of the nut-bearing plant, with an effective amount of a compound of formula (I) described herein.

Diflubenzuron {N-(2,6-difluorobenzoyl)-N'-(4-chlorophenyl)urea} which is commercially available as Dimilin® (Arysta LifeScience North America, LLC) belongs to the substituted 1-benzoyl-3-phenylurea family of pesticides, and acts by interfering with the production/deposition of chitin, one of the main components of the insect exoskeleton. Diflubenzuron provides control of a number of important pests in a variety of fruits, field crops, pasture and turf, horticulture and fish waters. Diflubenzuron may be a slow-release molecule for the main metabolite 4-chlorophenylurea (CPU). U.S. Pat. No. 6,242,385. Diflubenzuron may also be rapidly degraded by eucaryotic microorganisms, such as, *Fusarium* sp. *Cephalosporium* sp. *Penicillium* sp., and *Rhodotorula* sp. Cleavage of the urea bridge of diflubenzuron yielded metabolites 2,6-difluorobenzoic acid (DFBA), 4-chlorophenylurea, 4-chloroaniline, 4-chloroacetanilide, acetanilide, and 4-chlorophenol. (Pesticide Biochemistry and Physiology, 10, 2, pp. 174-180, 1979).

SUMMARY OF THE INVENTION

In accordance with the present disclosure, it has now been found that diflubenzuron and its metabolite CPU are useful in promoting yield in nut-bearing plants.

The present disclosure provides, among other things, methods of enhancing yield in nut-bearing plants by applying between bud break and during early nut formation of the nut-bearing plant, an amount effective for promoting yield of an active amount of a compound represented by structural formula (I):

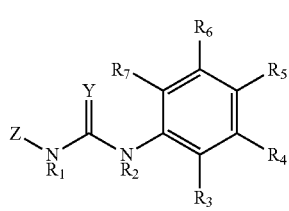

(I)

or agriculturally acceptable salt, and metabolites thereof; wherein:

Y may be O or S;

$R_1$ may be H, an alkyl group, a hydroxy group, an alkoxy group, or an alkoxymethyl group;

$R_2$ may be H, an alkyl group, a hydroxy group, an alkoxy group, or an alkoxymethyl group;

each $R_3$, $R_4$, $R_5$, $R_6$, and $R_7$ may be independently selected from the group consisting of H, halogen, alkyl, alkenyl, alkoxy, aryl, aryloxy, nitro, cyano, alkylthio, alkylsulfinyl, alkylsulfonyl, and alkylenedioxy;

Z may be H, or a moiety having the formula (II)

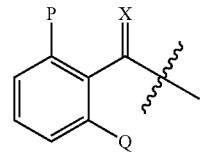

(II)

wherein,

X may be O or S;

P may be H, halogen, methyl, or methoxy; and

Q may be H, halogen, methyl, or methoxy.

In certain embodiments, Y is O. In certain embodiments, Y is S.

In certain embodiments, X is O. In certain embodiments, X is S.

In certain embodiments, $R_1$ is H, or an alkyl group. In certain embodiments, $R_1$ is H. In certain embodiments, $R_1$ is an alkyl group. In certain embodiments, $R_1$ is an alkoxy group. In certain embodiments, $R_1$ is an alkoxymethyl group.

In certain embodiments, $R_2$ is H, or an alkyl group. In certain embodiments, $R_2$ is H. In certain embodiments, $R_2$ is an alkyl group. In certain embodiments, $R_2$ is an alkoxy group. In certain embodiments, $R_2$ is an alkoxymethyl group.

In certain embodiments, each $R_3$, $R_4$, $R_5$, $R_6$, and $R_7$ is independently selected from the group consisting of H, halogen, and an alkyl group. In certain embodiments, each $R_3$, $R_4$, $R_5$, $R_6$, and $R_7$ is independently selected from the group consisting of H, halogen, and methyl. In certain embodiments, each $R_3$, $R_4$, $R_5$, $R_6$, and $R_7$ is independently selected from the group consisting of H, I, Br, Cl, F, and methyl. In certain embodiments, one of $R_3$, $R_4$, $R_5$, $R_6$, and $R_7$ is independently selected from the group consisting of I, Br, Cl, F, and methyl. In certain embodiments, the phenyl group attached to the urea moiety of formula (I) is mono-substituted by one of $R_3$, $R_4$, $R_5$, $R_6$, and $R_7$ (i.e., when four of $R_3$, $R_4$, $R_5$, $R_6$, and $R_7$ are H). In certain embodiments, the phenyl group attached to the urea moiety of formula (I) is di-substituted by two of $R_3$, $R_4$, $R_5$, $R_6$, and $R_7$ (i.e., when three of $R_3$, $R_4$, $R_5$, $R_6$, and $R_7$ are H). In certain embodiments, the phenyl group attached to the urea moiety of formula (I) is tri-substituted by three of $R_3$, $R_4$, $R_5$, $R_6$, and $R_7$ (i.e., when two of $R_3$, $R_4$, $R_5$, $R_6$, and $R_7$ are H). In a specific embodiment, $R_3$ is halogen. In a more specific embodiment, $R_3$ is Cl. In a specific embodiment, $R_4$ is halogen. In a more specific embodiment, $R_4$ is Cl. In a specific embodiment, $R_5$ is halogen. In a more specific embodiment, $R_5$ is Cl. In a specific embodiment, $R_6$ is halogen. In a more specific embodiment, $R_6$ is Cl. In a specific embodiment, $R_7$ is halogen. In a more specific embodiment, $R_7$ is Cl. In certain embodiments, at least one of $R_3$, $R_4$, $R_5$, $R_6$, and $R_7$ is not H.

In certain embodiments, each of P and Q is independently selected from the group consisting of H, I, Br, Cl, F, methyl, or methoxy. In certain embodiments, each of P and Q is independently H, I, Br, Cl, or F. In a specific embodiment, P and Q are both halogen. In a more specific embodiment, P and Q are both F.

DETAILED DESCRIPTION OF THE EMBODIMENTS

Certain embodiments of the present disclosure provide methods of enhancing plant growth in nut-bearing plants by applying between bud break and during early nut formation of the nut-bearing plant, an amount effective for promoting plant growth of an active amount of a substituted benzoyl urea of formula (III):

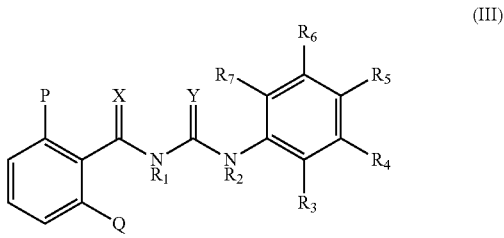

(III)

wherein the variables in Formula III are defined herein.

In certain embodiments, the substituted benzoyl urea have the following formula (IIIa):

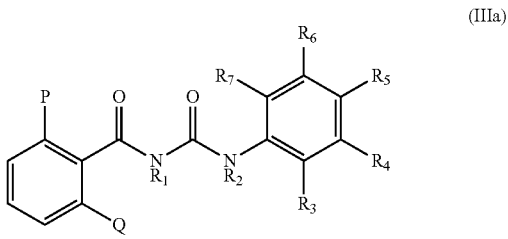

(IIIa)

Specific substituted benzoyl urea for use in the practice of the present embodiments include, but are not limited to, N-(2,6-dichlorobenzoyl)-N'-(3,4-dichlorophenyl)urea, N-(2,6-difluorobenzoyl)-N'-(3,4-dichlorophenyl)urea, N-(2,6-dimethylbenzoyl)-N'-(3,4-dichlorophenyl)urea, N-(2,6-dichlorobenzoyl)-N'-(4-chlorophenyl)urea, N-(2,6-dimethylbenzoyl)-N'-(4-chlorophenyl)urea, N-(2,6-dichlorobenzoyl)-N'-(2,4-dichlorophenyl)urea, N-(2,6-dichlorobenzoyl)-N'-(4-cyclopropylphenyl)urea, N-(2,6-dichlorobenzoyl)-N'-(3-chloro-4-iodophenyl)urea, N-(2,6-dichlorobenzoyl)-N'-(3-chloro-4-bromophenyl)urea, N-(2,6-dichlorobenzoyl)-N'-(4-isopropylphenyl)urea, N-(2,6-dichlorobenzoyl)-N'-(3,4-dibromophenyl)urea, N-(2,6-dichlorobenzoyl)-N'-(4-fluorophenyl)urea, N-(2,6-dichlorobenzoyl)-N'-(3-trifluoromethylphenyl)urea, N-(2,6-dichlorobenzoyl)-N'-(4-n-butylphenyl)urea, N-(2,6-dichlorobenzoyl)-N'-(3-chloro-4-methylsulfonylphenyl)urea, N-(2,6-dichlorobenzoyl)-N'-(4-t-butylphenyl)urea, N-(2,6-dichlorobenzoyl)-N'-(3,4-difluorophenyl)urea, N-(2,6-dichlorobenzoyl)-N'-(2,4-difluorophenyl)urea, N-(2,6-dichlorobenzoyl)-N'-(4-bromophenyl)urea, N-(2,6-dichlorobenzoyl)-N'-(2,5-difluoro-4-bromophenyl)urea, N-(2,6-dichlorobenzoyl)-N'-(4-iodophenyl)urea, N-(2,6-dichlorobenzoyl)-N'-(3-fluoro-4-chlorophenyl)urea, N-(2,6-dichlorobenzoyl)-N'-(4-phenylphenyl)urea, N-(2,6-dichlorobenzoyl)-N'-(4-cyanophenyl)urea, N-(2,6-dichlorobenzoyl)-N'-(3-fluoro-4-bromophenyl)urea, N-(2,6-dichlorobenzoyl)-N'-(3-fluoro-4-iodophenyl)urea, N-(2,6-dichlorobenzoyl)-N'-(2-fluoro-4-iodophenyl)urea, N-(2,6-dichlorobenzoyl)-N'-(4-n-propylphenyl)urea, N-(2,6-dichlorobenzoyl)-N'-(4-trifluoromethylphenyl)urea, N-(2,6-dichlorobenzoyl)-N'-(3-cyclopropylphenyl)urea, N-(2,6-dichlorobenzoyl)-N'-(2-methyl-4-chlorophenyl)urea, N-(2,6-dichlorobenzoyl)-N'-(4-sec-butylphenyl)urea, N-(2,6-dichlorobenzoyl)-N'-(4-iso-butylphenyl)urea, N-(2,6-dichlorobenzoyl)-N'-(4-ethylphenyl)urea, N-(2,6-dichlorobenzoyl)-N'-(4-n-dodecylphenyl)urea, N-(2,6-dichlorobenzoyl)-N'-4-benzylphenyl)urea, N-(2,6-dibromobenzoyl)-N'-(3,4-dichlorophenyl)urea, N-(2,6-dichlorobenzoyl)-N'-(methyl)-N'-(3,4-dichlorophenyl)urea, N-(2,6-dichlorobenzoyl)-N'-(ethyl)-N'-(3,4-dichlorophenyl)urea, N-(2,6-dichlorobenzoyl)-N'-(methyl)-N'-(4-t-butylphenyl)urea, N-(2,6-dichlorobenzoyl)-N'-(methyl)-(4-bromophenyl)urea, N-(2,6-dichlorobenzoyl)-N'-(ethyl)-N'-(4-bromophenyl)urea, N-(2,6-dichlorobenzoyl)-N'-(ethyl)-N'-(4-isopropylphenyl)urea, N-(2,6-dichlorobenzoyl)-N'-(ethyl)-N'-(4-n-butylphenyl)urea, N-(2,6-dichlorobenzoyl)-N'-(methyl)-N'-(4-chlorophenyl)urea, N-(2,6-dichlorobenzoyl)-N'-(ethyl)-N'-(4-chlorophenyl)urea, N-(2,6-dichlorobenzoyl)-N'-(ethyl)-N'-(4-t-butylphenyl)urea, N-(2,6-dichlorobenzoyl)-N'-(methyl)-N'-(4-nitrophenyl)urea, N-(2,6-dichlorobenzoyl)-N'-(2,4,5-trichlorophenyl)urea, N-(2,6-dichlorobenzoyl)-N'-(phenyl)urea, N-(2,6-dichlorobenzoyl)-N'-(4-nitrophenyl)urea, N-(2,6-difluorobenzoyl)-N'-(4-trifluoromethylphenyl)urea, N-(2,6-difluorobenzoyl)-N'-(4-n-butylphenyl)urea, N-(2,6-difluorobenzoyl)-N'-(4-t-butylphenyl)urea, N-(2,6-difluorobenzoyl)-N'-(4-isopropylphenyl)urea, N-(2,6-difluorobenzoyl)-N'-(3-fluoro-4-iodobenzyl)urea, N-(2,6-difluorobenzoyl)-N'-(3-fluoro-4-chlorophenyl)urea, N-(2,6-difluorobenzoyl)-N'-(3-trifluoromethylphenyl)urea, N-(2,6-difluorobenzoyl)-N'-(4-isobutylphenyl)-N'-(methyl)urea, N-(2,6-difluorobenzoyl)-N'-(4-chlorophenyl)urea, N-(2,6-difluorobenzoyl)-N'-(4-bromophenyl)urea, N-(2,6-difluorobenzoyl)-N'-(4-fluorophenyl)urea, N-(2,6-difluorobenzoyl)-N'-(4-thiomethylphenyl)urea, N-(2,6-difluorobenzoyl)-N'-(methyl)-(4-chlorophenyl)urea, and N-(2,6-difluorobenzoyl)-N'-(methoxymethyl)-N'-(3,4-dichlorophenyl)urea.

In certain embodiments, the substituted benzoyl urea is diflubenzuron (N-(2,6-difluorobenzoyl)-N'-(4-chlorophenyl)urea).

Embodiments of the present disclosure also provide methods of enhancing plant growth in nut-bearing plants by applying between bud break and during early nut formation of the nut-bearing plant nut formation, an amount effective for promoting plant growth of an active amount of a phenylurea of formula (IV):

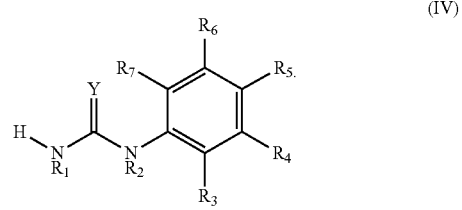

(IV)

wherein the variables in Formula IV are defined herein.

In certain embodiments, wherein the phenylurea have the following formula (IVa):

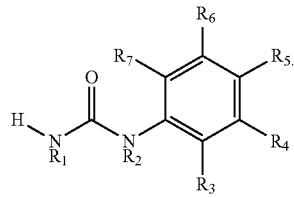

Specific phenylureas for use in the practice of the present embodiments include, but are not limited to, phenylurea, 4-chlorophenylurea, 3-bromophenylurea, 2-fluorophenylurea, 4-iodophenylurea, 3,4-dichlorophenylurea, 2,6-difluorophenylurea, 2,4-dibromophenylurea, 4-chloro-2-fluorophenylurea, 2,4-difluorophenylurea, 3-chloro-4-fluorophenylurea, 3-tolylurea, 2-ethylphenylurea, 2,4,5-trichlorophenylurea, 2,6-dichloro-3-methylphenylurea, 4-t-butylphenylurea, 4-n-butylphenylurea, 2-isopropylphenylurea, 4-n-octylphenylurea, 4-dodecylphenylurea, 4-hexadecylphenylurea, 4-cyclohexylphenylurea, 2,3-dimethylphenylurea, 2,6-diethylphenylurea, 3,5-di-t-butylphenylurea, 4-allylphenylurea, 4-trifluoromethylphenylurea, 2-fluoro-4-methylphenylurea, 2,5-bis(trifluoromethyl)phenylurea, 2-fluoro-3-(trifluoromethyl)phenylurea, 3-chloro-4-methylphenylurea, 4-chloro-3-(trifluoromethyl) phenylurea, 3-methoxyphenylurea, 4-ethoxyphenylurea, 4-hexyloxyphenylurea, 4-phenoxyphenylurea, 4-[1,1'-biphenyl]ylurea, 3-fluoro-2-methoxyphenylurea, 4-methoxy-2-methylphenylurea, 2-methoxy-5-trifluoromethylphenylurea, 2-methoxy-5-trifluoromethoxyphenylurea, 3,4-dimethoxyphenylurea, 3,4,5-trimethoxyphenylurea, 2,3,4,5,6-pentafluorophenylurea, 4-methylthiophenylurea, 4-methylsulfinylphenylurea, 4-methylsulfonylphenylurea, 4-nitrophenylurea, 3,4-methylendioxyphenylurea, and the like.

In certain embodiments, the phenylurea is 4-chlorophenylurea.

As used herein, the term "alkyl" refers to the compounds of this invention is deemed to include cycloalkyl and alkyl substituted cycloalkyl structures as well, for example, cyclopentyl, cyclohexyl, 4-methylcyclohexyl, and the like.

The term "alkyl," as used herein, alone or in combination, refers to a straight-chain or branched-chain alkyl radical containing from 1 to and including 20, e.g., 1 to 10, and 1 to 6 carbon atoms. Alkyl groups may be optionally substituted cycloalkyl structures as well, for example, cyclopentyl, cyclohexyl, 4-methylcyclohexyl, and the like. Examples of alkyl radicals include methyl, ethyl, n-propyl, isopropyl, n-butyl, isobutyl, sec-butyl, tert-butyl, pentyl, iso-amyl, hexyl, octyl, noyl and the like.

The term "alkenyl," as used herein, alone or in combination, refers to a straight-chain or branched-chain hydrocarbon radical having one or more double bonds and containing from 2 to 20, preferably 2 to 6, carbon atoms. Alkenylene refers to a carbon-carbon double bond system attached at two or more positions such as ethenylene [(—CH═CH—), (—C::C—)]. Examples of suitable alkenyl radicals include ethenyl, propenyl, 2-methylpropenyl, 1,4-butadienyl and the like.

The term "alkoxy," as used herein, alone or in combination, refers to an alkyl ether radical wherein the term alkyl is as defined above. Examples of suitable alkyl ether radicals include methoxy, ethoxy, n-propoxy, isopropoxy, n-butoxy, iso-butoxy, and the like.

The term "alkylthio," as used herein, alone or in combination, refers to an alkyl thioether (R—S—) radical wherein the term alkyl is as defined above and wherein the sulfur may be singly or doubly oxidized. Examples of suitable alkyl thioether radicals include methylthio, ethylthio, n-propylthio, isopropylthio, n-butylthio, iso-butylthio, sec-butylthio, tert-butylthio, methanesulfonyl, ethanesulfinyl, and the like.

The term "alkylsulfinyl," as used herein, alone or in combination, refers to an alkyl group attached to the parent molecular moiety through a sulfinyl group.

The term "alkylsulfonyl," as used herein, alone or in combination, refers to an alkyl group attached to the parent molecular moiety through a sulfonyl group.

The term "aryl," as used herein, alone or in combination, means a carbocyclic aromatic system containing one, two or three rings wherein such rings may be attached together in a pendent manner or may be fused. The term "aryl" embraces aromatic radicals such as benzyl, phenyl, naphthyl, and biphenyl.

The term "aryloxy," as used herein, alone or in combination, refers to an aryl group attached to the parent molecular moiety through an oxygen atom.

The term "halogen," as used herein, alone or in combination, refers to F, Cl, Br, or I.

The term "effective amount" when used in reference to an active ingredient (i.e., compounds of the present embodiments), is an amount of active ingredient necessary to promote yield (e.g., nut yield) of a nut-bearing plant. Typically, an effective amount of active ingredient will promote yield of a nut-bearing plant by at least 5%, 10%, 15%, 20%, 25%, or 30% as compared to an untreated nut-bearing plant (i.e., without contact with the active ingredient).

The term "plants" includes germinant seeds, emerging seedlings, and established vegetation, including roots and above-ground portions (for example, leaves, stalks, flowers, fruits, branches, limbs, root, etc.). The term "nut-bearing plants," as the name implies, refers to plants that produce nuts.

In embodiments, the nut-bearing plant has separate male (catkin) flowers and female (pistillate) flowers. In embodiments, the nut-bearing plant does not have a catkin (i.e., anthers and pistils in the same flower). The nut-bearing plant may be pollinated by wind (also referred to as wind-pollinated). The nut-bearing plant may be pollinated by insects, such as, bees and flies. The nut-bearing plant may be self-pollinated by wind. Pollination takes place when pollen is transferred from the male anther to the female stigma. Examples of nut-bearing plant include, but are not limited to, Walnut, Hazelnut, Hickory, Almond, Beechnut, Brazil nut, Butternut, Macadamia, Pecan, Pistachio, Lychee, Cashew, and Chestnut trees.

In embodiments, the nut-bearing plant is a Walnut. Examples of walnut cultivars include, but are not limited to, Ashley, Eureka, Tulare, Chandler, Hansen, Hartley, Howard, Serr, Vina, Cisco, Eureka, Fernette, Forde, Franquette, Gillet, Ivanhoe, Payne, Paradox, Persian, Poe, Rita, Robert Livermore, Royal, Sexton, Solano, Sunland, Wilson's Wonder, Yolo, and Tehama cultivars.

In embodiments, the nut-bearing plant is a Chandler walnut. In embodiments, the nut-bearing plant is a Tulare walnut.

Walnuts belong to the genus *Juglans* within the family Juglandaceae. The Juglandaceae family also include Pecan, Wingnut, and Hickory.

In embodiments, the nut-bearing plant is a Pecan. In embodiments, the nut-bearing plant is a Wingnut. In embodiments, the nut-bearing plant is a Hickory. In embodiments, the nut-bearing plant is a Hazelnut. In embodiments, the nut-bearing plant is an Almond. In embodiments, the nut-bearing plant is a pistachio.

The compositions comprising the compounds of formula (I), (II), (III), (IIIa), (VI), or (IVa) of the present embodiments (or active ingredient) may be applied to the nut-bearing plant any time between bud break and during early nut formation of the nut-bearing plant. In certain embodiments, the compositions can be applied to the nut-bearing plant between bud break and at the time when the nut-bearing plant bears a developing nut of 1 inch length (or ¾ inch length, or ½ inch length).

In certain embodiments, the compositions can be applied to the nut-bearing plant between bud break and at the time when the nut-bearing plant bears a developing nut of 1 inch length (or ¾ inch length, or ½ inch length, or ¼ inch length). In further embodiments, the application time is between pollination of the pistal and at the time when the nut-bearing plant bears a developing nut of 1 inch length. In further embodiments, the application time is between fertilization of the pistal and at the time when the nut-bearing plant bears a developing nut of 1 inch length.

In certain embodiments, the compositions can be applied to the nut-bearing plant during bloom but prior to the nut formation.

In certain embodiments, the compositions may be applied to the nut-bearing plants during a time period between 5 days prior to and 5 days after a bloom period of the nut-bearing plant. In certain embodiments, the compositions may be applied to the nut-bearing plants during a time period between 3 days prior to and 3 days after a bloom period of the nut-bearing plant. In certain embodiments, the compositions can be applied to the nut-bearing plant during early nut formation.

Bud breaking ("bud break") indicates the beginning of the bloom period ("bloom"), when the dormant bud opens and the shoot and flower structures begin to grow.

The term "early nut formation" used herein refers to the time period between the first appearance of a developing nut and 1 inch length of the developing nut. In certain embodiment, between the first appearance of a developing nut and ¾ inch length of the developing nut. In certain embodiment, between the first appearance of a developing nut and ½ inch length of the developing nut. In certain embodiment, between pollination and fertilization of the pistil and the first appearance of a developing nut and ¼ inch length of the developing nut. The length of a developing nut is measured from the base to the apical tip of the developing nut.

The pistillate flowers of the nut-bearing plants may be partially, or fully developed before the catkins begin shedding the pollen. The catkins of the nut-bearing plants may begin shedding pollen prior to the pistillate flowers beginning to bloom.

In some instances, the pistillate flower may be fully developed (i.e., 100% pistillate flower bloom) before the catkin is fully enlongated (i.e., at 100% catkin elongation). When the catkin is fully enlongated, the last pollen is shed. Walnut and pecan, monoecious species, are dichogamous. For some cultivars, the male flowers bloom before the female flowers (protandry). For others, the females bloom first (protogyny).

In some instances, the catkin may be fully enlongated (i.e., at 100% catkin elongation) before the pistillate flower is fully bloomed (i.e., when all pistillate blooms open, 100% pistillate flower bloom). Shortly after (e.g., from 1 to 3 days after) the pistillate flower is fully bloomed, the pistillate flower (pistil) become unreceptive to pollen.

Typically, pistillate flower blooms receptivity to pollen ends prior to nut formation of the nut-bearing plant. Pistillate flower blooms receptivity to pollen may end from 1 day to 10 days prior to nut formation of the nut-bearing plant.

In certain embodiments, the compositions can be applied to the nut-bearing plant between bud break and a time when the pistillate flower blooms receptivity to pollen ends. In certain embodiments, the compositions can be applied to the nut-bearing plant between bud break and at least 1 day prior to nut formation of the nut-bearing plant. In certain embodiments, the compositions can be applied to the nut-bearing plant between bud break and a time from 1 day to 20 days prior to nut formation of the nut-bearing plant.

In certain embodiments, the compositions can be applied to the nut-bearing plant between bud break and 100% (or, 90%, 80%, 70%, 60%, 50%, 40%, 30%, 20%, and 10%) catkin elongation.

In certain embodiments, the compositions can be applied to the nut-bearing plant between bud break and 100% (or, 90%, 80%, 70%, 60%, 50%, 40%, 30%, 20%, and 10%) pistillate flower bloom.

In certain embodiments, the compositions can be applied to the nut-bearing plant between bud break and 100% catkin elongation, or between bud break and 100% pistillate flower bloom.

In nut bearing plants where catkins and pistillate blooms are not separate, such as almonds, where the stamens and pistil are within the same flower, the compositions may be applied to the nut-bearing plant from bud break to 100% pistillate flower bloom and when the pistil is no longer receptive to the pollen.

In embodiments, the compositions may be applied once to the nut-bearing plant to promote yield. In embodiments, the compositions may be applied multiple times (twice, 3-times, 4-times, 5-times, or more) to the nut-bearing plant to promote yield.

For these applications, the composition may be applied to the nut-bearing plant at a rate of from about 0.1 to about 30, from about 0.5 to about 15, from about 1.0 to about 10, from about 2.0 to about 8.0 fluid ounce, or from about 2.0 to about 16.0 fluid ounce (fl. oz.) per acre. The active ingredient may be present in the composition in the amount of from 1% to 100%, from 5% to 95%, from 10% to 90%, from 15% to 85%, or from 20% to 80% by weight based on the total weight of the composition. In certain embodiments, the effective amount of the active ingredients may be applied to the nut-bearing plants in the absence of insect pressure on the plant. The term "in the absence of insect pest pressure" includes situations in which insect pests are not present in the nut-bearing plant, as well as situations where such insect pests are present within the area of a plant, but in a quantity which does not interfere with the nut yield of the plant, as well in situations where such insect pests are present within the area of a plant, but are controlled by insecticides other than diflubenzuron. In certain embodiments, the effective amount of the active ingredients may be applied to the nut-bearing plants in the presence of insect pressure on the plant, which cause yield loss, but which yield loss is equivalent in the plants in the presence or absence of diflubenzuron.

In another aspect of the disclosure, compositions comprising the compounds of the present disclosure (active ingredients) may be mixed with other active compounds, such as fungicides, bacteriacides, antibiotics, insecticides, acaricides, nematicides, bird repellents, growth substances, and plant nutrients.

In certain embodiments, the compositions of the present disclosure are mixed with a fungicide composition. Co-application of the active ingredient and fungicide is particularly useful in promoting nut yield at the same time controlling fungicide activity of the nut-bearing plant. In certain embodiments, the fungicide composition is a blight-inhibiting fungicide composition. In certain embodiments, the fungicide composition is a walnut blight-inhibiting fungicide composition. In certain embodiments, the walnut blight-inhibiting composition is a mixture of a FRAC Group M1 inhibitor and a FRAC Group M3 inhibitor. In certain embodiments, the FRAC Group M1 inhibitor is a copper-based compound. In certain embodiments, the copper-based compound is copper hydroxide. In certain embodiments, the FRAC Group M3 inhibitor is mancozeb. In certain embodiments, the walnut blight-inhibiting composition is a mixture of a FRAC Group 24 inhibitor and a FRAC Group M1 inhibitor. In certain embodiments, the walnut blight-inhibiting composition is a bacteriacide FRAC Group 24. In certain embodiments, the fungicidal composition inhibits botryospaeria and *Phomopsis* panicle blight and cankers. In certain embodiments, the fungicide composition is an Eastern filbert blight fungicide composition. In certain embodiments, the fungicide composition is a brown Rot Blossom Blight (Monilinia) fungicide composition. In certain embodiments, the fungicidal composition comprises a demethylation inhibitor of FRAC Group 3. In certain embodiments, the fungicidal composition comprises tebuconazole.

Co-application can be achieved using tank mixes of preformulated individual active ingredients and fungicide, simultaneous or sequential application of such formulations or application of preformulated fixed pre-mix combinations of the individual active ingredients and fungicide.

Both the compositions of the present embodiments (i.e., comprising the active ingredients), and the dual compositions (i.e., comprising both active ingredients and fungicide) may be applied in any suitable form, such as dry, powder or dusting powder, slurry, liquid, suspension, emulsion, dispersion, diluted liquid or nebulized spray. In those instances where the composition is diluted or in liquid/slurry/nebulized form, it can be diluted with any suitable carrier.

The term "suitable carrier" refers to any solid or liquid which is biologically, chemically, and physically compatible with the active ingredients and/or fungicide.

A suitable carrier useful in the compositions containing the active ingredients of the present embodiments, can be a finely divided or granular organic or inorganic inert material. Useful inert carriers include attapulgite clay, sand, vermiculite, corncobs, activated carbon and mineral silicates such as mica, talc, pyrophyllite and clays. The suitable carrier can also be a solvent. The active ingredients is dissolved in a suitable solvent, or mixture of solvents, which acts as the carrier. Useful solvents include acetone, methanol, ispropanol, t-butyl alcohol, cyclohexanone, toluene, xylene, dioxane, dimethylformamide, dimethylsulfoxide, ethylene dichloride, diacetone alcohol, and N-methylpyrrolidone.

The active ingredients can also be dissolved in a suitable solvent or mixture of solvents, together with a surface active agent, to produce an emulsion. Examples of useful surface active agents can be found, e.g., in McCutcheon's Detergents and Emulsifiers (Allured Publishing Corp., Ridgewood, N.J., 1970); U.S. Pat. Nos. 2,514,916; and 2,547,734. The surface active agents can be anionic, non-ionic or cationic.

The suitable carrier can be a dispersant comprising a suitable solvent, a suitable surface active agent, and water. The active ingredients can be dissolved in the solvent to form a solution and the solution can then be dispersed in the water with the aid of the surface active agent.

The active ingredients can also be premixed with an inert solid carrier which is added to a surface active agent and water to provide another form of dispersion type carrier.

The active ingredients can take the form of dust, granules or a paste of a wettable powder. The active ingredients are admixed with an inert solid carrier to form a solid composition. To form a powder, the solid inert carrier, such as a mineral silicate, is provided in powder form. The solid composition can be made wettable by the addition of a surface active agent.

Finally, the suitable carrier can be an aerosol. To prepare an aerosol composition, the active ingredients are initially dissolved in a volatile first solvent. The resultant solution is then admixed with a highly volatile solvent, and a liquid aerosol carrier. A highly volatile solvent is liquid only under elevated pressure. At ordinary temperatures and at atmospheric pressure, the highly volatile solvent is a gas. The liquid aerosol carrier is a highly volatile solvent, but the volatile first solvent is not a highly volatile solvent. The aerosol carrier can itself be pesticidally active. For example, the aerosol carrier can be an insecticide, an herbicide, a bactericide, or the like.

Unless otherwise defined, all technical and scientific terms used herein have the same meaning as commonly understood by one of ordinary skill in the art to which this invention belongs. Although methods and materials similar or equivalent to those described herein can be used in the practice or testing of the invention, suitable methods and materials are described herein.

All applications, publications, patents and other references, citations cited herein are incorporated by reference in their entirety. In case of conflict, the specification, including definitions, will control.

As used herein, the singular forms "a", "and," and "the" include plural referents unless the context clearly indicates otherwise.

As used herein, all numerical values or numerical ranges include integers within such ranges and fractions of the values or the integers within ranges unless the context clearly indicates otherwise. Thus, for example, reference to a range of 90-100%, includes 91%, 92%, 93%, 94%, 95%, 95%, 97%, etc., as well as 91.1%, 91.2%, 91.3%, 91.4%, 91.5%, etc., 92.1%, 92.2%, 92.3%, 92.4%, 92.5%, etc., and so forth. Reference to a range of 90-100% includes 92.2% to 97.5%, 91.5 to 94.5, etc. Reference to a series of ranges, such as, overlapping ranges between 0.1% and 15%, and between 1% and 10%, include ranges between 0.1% and 1%, 0.1% and 10%, 1% and 15%, and 10% and 15%. Reference to a range of from 5 days prior to includes from 5 days, 4 days, . . . 1 day prior to. Reference to a range of from 1 day to 20 days prior to includes from 2 days, 3 days, . . . 20 days prior to.

The invention is generally disclosed herein using affirmative language to describe the numerous embodiments. The invention also specifically includes embodiments in which particular subject matter is excluded, in full or in part, such as substances or materials, method steps and conditions, protocols, procedures, assays or analysis. Thus, even though the invention is generally not expressed herein in terms of what the invention does not include aspects that are not expressly included in the invention are nevertheless disclosed herein.

A number of embodiments of the invention have been described. Nevertheless, it will be understood that various modifications may be made without departing from the spirit and scope of the invention. Accordingly, the following examples are intended to illustrate but not limit the scope of invention described in the claims.

To illustrate the invention, specific examples are set forth below. These examples are merely illustrations and are not to be understood as limiting the scope and underlying principles of the invention in any way. Various modifications of the invention in addition to those shown and described herein will become apparent to those skilled in the art form the following examples and foregoing description. Such modifications are also intended to fall within the scope of the appended claims.

EXAMPLES

Several scientific and replicated field research trials were conducted in multiple locations to evaluate the enhancement of nut yield on walnuts after treatment with diflubenzuron.

Example 1

Increased Yield in Tulare Walnuts (1.5 Acres Scale)

This study was initiated to test Dimilin® 2L (22.0% diflubenzuron, N-[[(4-Chlorophenyl)amino]carbonyl]-2,6-difluorobenzamide]) for its plant growth regulator (PGR) effect on increasing yield on Tulare walnuts, *Juglans regia* L. The test location was a private, commercial walnut orchard at Deseret Farms in Hamilton City, Calif.

Experimental Design:

The study was set up as a randomized complete block design, replicated six times, with each plot being six rows wide by 14 trees long (1.5 acres per plot).

Six "experimental" plots were treated with Treatment (1) according to embodiments of the present disclosure, which contained 8 fluid ounces per acre Dimilin® 2L; 4 ounces per acre of tebuconazole 45 DF (45% tebuconazole); 4 ounces per acre of Nu-Cop 50DF (76.77% copper hydroxide); 1.2 pounds per acre Manzate Pro Stick (75% mancozeb); 1 pound per acre Zinc sulfate (36% zinc sulfate); 8 fluid ounces per acre R-56 (40% alpha-(p-nonylphenyl)-2-hydroxypoly, 33% 4-nonylphenol, formaldehyde resin, propoxylated) spreader sticker.

Six "untreated control" plots were treated with untreated control Treatment (2) which contained 4 ounces per acre of tebuconazole 45 DF; 4 ounces per acre of Nu-Cop 50DF plus 1.2 pounds per acre Manzate Pro Stick; 1 pound per acre Zinc sulfate (36%); and 8 fluid ounces per acre R-56 spreader sticker.

Each treatment was applied using a Deseret Farms tractor powered air-blast sprayer operating at about 2 mph and applying about 50 gallons per acre of finished spray volume to every other row. Experimental Treatment (1) was applied three times to each of six "experimental" plots during bloom, from bud break to 100% catkin elongation. Untreated control Treatment 2 was applied three times to all the "experimental" plots during bloom, from bud break to 100% catkin elongation as a standard treatment to control walnut blight during bloom from bud break to 100% catkin's elongation. Deseret Farms standard pest management practices were followed for control of Codling moth (*Cydia pomonella* L.), navel orangeworm (*Amyelois transitella* (Walker)), Twospotted spider mites (*Tetranychus urticae* Koch), and walnut aphid (*Chromaphis juglanicola* (Kaltenbach)) for the entire season over the entire orchard, including the "untreated control" and "experimental" plots.

The number of Codling moth infested dropped nuts was counted from the five randomly selected trees located in the center of each plot "center trees." After the nuts had been harvested and shaken by commercial, mechanical tree shakers, but before they had been picked up, the complete crop (including nuts, leaf litter, and twigs) from two representative center trees per plot were weighed to obtain a gross weight per tree. Time limitations imposed by a narrow harvest window, required that leaves and twigs be incorporated into this weight. Because of this, 5% of this harvest was sorted to determine the percentage of nuts, leaves, and twigs. After the nuts were separated from the twigs and leaves, they were weighed to obtain a wet-in-shell nut weight, and then dried for two weeks and reweighed to obtain a dry-in-shell nut weight. Using the percent nuts, percent leaf litter, and percent twigs, the total weight of dry-in-shell nuts per tree and the total weight of dry-in-shell nuts per acre were calculated. A sample of 100 dry-in-shell nuts per plot was cracked out. The nut meat and shells were weighed separately, and the percent of nuts infested with codling moth and navel orangeworm was determined.

The data were analyzed using Student-Newman-Keuls test with P=0.001. Student-Newman-Keuls (SNK) test is a stepwise multiple comparisons procedure used to identify sample means that are significantly different from each other. (De Muth, James E. (2006). *Basic Statistics and Pharmaceutical Statistical Applications* (2nd ed.). Boca Raton, Fla.: Chapman and Hall/CRC. pp. 229-259.).

Results and Discussion

There was a statistically significant increase in total dry-in-shell nut weight per acre in Experimental Treatment (1), where Dimilin® 2L was included in a tank mix with the fungicides to control walnut blight (Table 1). There was no statistically significant difference between treatments in gross weight per tree (which included nuts, leaf litter, and twigs). However, when the leaf litter and twigs were removed, the number of nuts per tree was significantly increased in Experimental Treatment (1), where Dimilin® 2L was added to the fungicides used to control walnut blight, compared to the untreated control Treatment (2) with only the fungicides to control walnut blight. (i.e., no Dimilin® was present). This translated into Dimilin® 2L providing a statistically significant increase in dry-in-shell nut weight per tree and per acre.

TABLE 1

Total yield per tree and acre of Tulare walnuts following bloom applications of Dimilin 2L

| Treatments | Mean* gross weight/ tree (lbs) | Mean* number nuts/ tree | Mean* total yield/tree (lbs, dry- in-shell nut weight) | Mean* total yield/acre (lbs, dry- in-shell nut weight) |
|---|---|---|---|---|
| 1) Dimilin ®2L | 131.0 a | 2733.5 a | 56.9 a | 5741.5 a |
| 2) Untreated control | 128.4 a | 2293.1 b | 46.2 b | 4658.5 b |
| P | 0.376 | 0.013 | 0.001 | 0.001 |

*Means followed by the same letter within a column are not significantly different (t-test, $p < 0.05$). Means followed by different letters are statistically different at p-values indicated below means.

Codling moth and navel orangeworm control: There was no statistically significant difference between the two treatments for mean number of codling moth infested dropped nuts (Table 2). There was no statistically significant difference between the two treatments in controlling Codling moth and navel orange worm infestations at harvest. There was no statistical difference between the two dry-in-shell nut weights for the samples of 100 nuts per treatment used to assess insect damage.

TABLE 2

Insect damage and in-shell and kernel weight per 100 Tulare walnuts following bloom applications of Dimilin ® 2L

| Treatments | Mean* number codling moth infested dropped nuts | Mean* percent nuts with codling moth and navel orangeworm damage at harvest | Mean* weight (lb. dry-in-shell nut)/ 100 nuts | |
|---|---|---|---|---|
| | | | In-shell | Kernel |
| Dimilin ® 2L | 1.9 a | 0.3 a | 2.62 a | 1.26 a |
| Untreated control | 2.6 a | 0.7 a | 2.56 a | 1.23 a |
| P | 0.147 | 0.248 | 0.186 | 0.205 |

*Means followed by the same letter within a column are not significantly different (t-test, $p < 0.05$)

Dimilin® Plant Growth Regulator (PGR) Effect:

The exact mechanism for Dimilin® yield increase in Tulare walnuts is unknown.

Conclusion

The results of this study show Dimilin® 2L provides a statistically significant increase in yield unrelated to insect damage as indicated by the increases in mean number of nuts per tree ($p=0.013$), mean pounds dried in shell nuts per tree ($p=0.001$), and pounds dried in shell nuts per acre ($p=0.001$) in Tulare walnuts.

Example 2

Increased Yield in Chandler Walnuts

This study was initiated to test Dimilin® 2L (22.0% diflubenzuron, N-[[(4-Chlorophenyl) amino]carbonyl]-2,6-difluorobenzamide]) for its PGR effect on increasing yield on Chandler walnuts, *Juglans regia* L. The test location was a private, commercial walnut orchard at Crows Landing, Stanislaus County, Calif.

Experimental Design:

The study was set up as a randomized complete block design, replicated six times, with each plot being 3 rows wide by 5 trees long. Six "experimental" plots were treated with untreated control Treatment (1). Six "experimental" plots were treated with Treatment (2) which contained Dimilin® 2L at 4 fluid ounces per acre, and Latron B-1956 (77% modified phthalic glycerol alkyd resin) spreader sticker at 8 fl oz/A. Six "experimental" plots were treated with Treatment (3) which contained Dimilin® 2L at 8 fluid ounces per acre, and Latron B-1956 (77% modified phthalic glycerol alkyd resin) spreader sticker at 8 fl oz/A. Six "experimental" plots were treated with Treatment (4) which contained ReTain® Plant Growth Regulator at 11.7 ounces per acre, and Latron B-1956 (77% modified phthalic glycerol alkyd resin) spreader sticker at 8 fl oz/A.

Each treatment was applied twice using a tractor powered Air-O-Fan air-blast sprayer operating at about 2 mph, pressure of about 120 pounds per square inch, and applying about 200 gallons per acre of finished spray volume to achieve thorough coverage of catkins and pistillate flowers. Treatments were applied twice. The first treatment was applied during bloom at about 25% to about 30% pistillate flower bloom, the majority of pistillate flowers were in the early flower development stage, and a small percentage of pistillate flowers were in the late flower development stage. The second treatment was applied during the late 100% pistillate flower bloom, when the majority of the pistillate flowers were in the late flower development stage. The walnut grower used standard pest management practices for control of walnut blight (*Xanthomonas campestris* pv *juglandis*), Codling moth (*Cydia pomonella* L.), navel orangeworm (*Amyelois transitella* (Walker)), Twospotted spider mites (*Tetranychus urticae* Koch), and walnut aphid (*Chromaphis juglanicola* (Kaltenbach)) for the entire season over the entire orchard, including the "experimental" and "untreated control" plots.

The nuts were harvested by commercial, mechanical tree shakers, and all the nuts from the middle three trees per plot were collected, dried and the in-shell dry weight (i.e., dry-in-shell nut weight) was taken. The dry-in-shell nut weight per middle three trees per plot was then converted into weight of dry-in-shell nuts per acre.

The data were analyzed using ANOVA with mean separation using Student-Newman-Keuls test at $p<0.1$.

Results and Discussion

Treatment 3 which contained Dimilin® 2L at 8 fluid ounces per acre, and Treatment 4 which contained ReTain® at 11.7 ounces per acre provided statistically significant increases in yields of 342.7 and 539.7 pounds of dry-in-shell nut weight per acre, respectively, compared to the untreated control Treatment 1. (Table 3). Treatment 2 which contained Dimilin® 2L at 4 fluid ounces per acre yield was statistically equivalent to the untreated control Treatment 1.

TABLE 3

Total dry-in-shell nut yield per acre of Chandler walnuts following bloom applications of Dimilin ® 2L.

| Treatments | Mean* total yield per acre (pounds of dry-in-shell nut weight) |
|---|---|
| 1) Untreated control | 5475.3 b |
| 2) Dimilin ® 2L at 4 fl oz/A | 5529.5 b |
| 3) Dimilin ® 2L at 8 fl oz/A | 5818.0 a |
| 4) ReTain ® at 11.7 oz/A | 6015.0 a |
| P | 0.1 |

*Means followed by the same letter within a column are not significantly different. Means followed by different letters are statistically different (Student-Newman-Keuls test, $p = 0.1$).

Due to windy conditions, the first treatment application was made late, at 25 to 30% pistillate flower bloom, as noted above, when a few of the pistillate flowers were at the late flower bloom development stage (post pollen receptivity), and the second treatment application was made five days later, when the majority of flowers were at the late flower development stage, which is late 100% pistillate flower bloom (post pollen receptivity). If the applications would have been made earlier and further apart in time, there may have been a larger increase in yield in the Dimilin® 2L treatments compared to the untreated check.

Dimilin® 2L PGR Effect:

The exact mechanism for Dimilin® yield increase in Chandler walnuts is unknown.

Conclusion

The results of this study showed that two applications of Dimilin® 2L at 8 fluid ounces per acre made at 25 to 30% pistillate flower bloom, and during late 100% bloom, respectively, provided a statistically significant increase of 342.7 pounds per acre of dry-in-shell nut weight yield in Chandler walnuts.

Example 3

Increased Yield in Tulare Walnuts (50 Acres Scale)

This study was initiated to test Dimilin® 2L (22.0% diflubenzuron, N-[[(4-Chlorophenyl) amino]carbonyl]-2,6-difluorobenzamide]) for its PGR effect on increasing yield on Tulare walnuts, Juglans regia L. The test location was a private, commercial walnut orchard at Deseret Farms in Hamilton City, Calif.

Test Crop:

Trial on walnut, Juglans regia L. 'Tulare' and planted on an 18 ft. tree spacing by 24 ft. row spacing (101 trees/acre).

Experimental Design:

Field demonstration design conducted in a Tulare walnut orchard. Fifty (50) acres were treated with Dimilin® 2L and 50 or more acres were not treated. There were 5 and 6 subsamples taken from the Dimilin 2L treated orchard and the untreated control orchard, respectively. Table 4 shows the treatments and timings of Dimilin® 2L and the untreated control.

TABLE 4

Treatments* and Timings:

| Treatment | Rate form/ac | No. Appl. | Application timing |
|---|---|---|---|
| 1) Dimilin ® 2L | 8.0 fl. oz | 2 | April 17 and 24 |
| 2) Untreated Control | — | 2 | April 17 and 24 |

*Treatments include NuCop 50 at 4.0 lb/ac, Manzate Pro Stick at 1.2 lb/ac, Zinc Sulfate 36% at 1.0 lb/ac and R-56 at 8 fl. oz/ac.
"form/ac" means formulation/acre or formulated product/acre.

Application Equipment:

Foliar sprays were applied to every other row with grower operated engine driven commercial GVF 10,000 Sonic air-blast sprayers operating at 2 mph with 100 gal/ac finished spray volume to achieve thorough coverage of flower buds and flowers without excessive runoff.

Applications:

Dimilin 2L treatments were applied to entire field on April 17 and 7 days later on April 24 in the year 2018. Standard pest management practices were followed for control of codling moth, navel orangeworm, walnut husk fly, twospotted spider mite and walnut aphid for the entire season over the entire orchard. The following insecticide/miticides applications occurred on or shortly after the dates indicated. The entire field was treated with Altacor 35WG on May 15, Intrepid Edge on June 26, Assail 70WP on July 9, 16, and 23, Vigilant 4SC on 26 July, Assail 70WP on July 30 and August 6 and 13, Altacor 35WG on August 23 and Assail 70WP on August 27.

Evaluation Procedures:

The number of codling moth infested dropped nuts were counted from 10 trees at 5 locations on both sections of the orchard on June 4. At commercial harvest on September 19-21, the number of trees required to fill each of five trailers on the Dimilin® 2L section and five trailers in the non-Dimilin® 2L section were recorded and the net wet weight of husk, nuts and debris of each trailer was determined.

A sample from each of four trailers in the Dimilin® 2L section and five trailers in the non-Dimilin® 2L section were weighed and then sorted by nuts without husk and debris including husk and reweighed. The number and weight of nuts was determined and then dried and reweighed.

Statistical Analysis:

Data was analyzed using ANOVA with mean separation using Student's T test at $P \leq 0.1$.

Results and Discussion:

There was no significant difference in the mean number of codling moth infested dropped nuts between the Dimilin® 2L treatment and the untreated control and the total number of codling moth infested dropped nuts/tree was low (Table 5).

TABLE 5

Mean number of codling moth infested dropped nuts per tree near Hamilton City, CA.

| Treatment | Rate form/ac | Mean* No. CM-infested dropped nuts/10 trees |
|---|---|---|
| Dimilin ® 2L | 8.0 fl. oz | 35.2 a |
| Untreated Control | — | 25.2 a |

*Mean followed by the same letter within a column are not significantly different using Student-Newman-Keuls test ($P \leq 0.1$)

There was significant lower mean number of trees required to fill a trailer in Dimilin® 2L treated section compared to the untreated control section. Also, the mean net trailer weight was significantly greater in the Dimilin® 2L treated section compared to the untreated control section (Table 6). The mean total, wet nut and dry nut weight per acre was significantly greater in the Dimilin® 2L treated section compared to the untreated control section. The mean wet nut weight per tree also increased significantly in the Dimilin® 2L treated section compared to the untreated control section. The increase in yield as a result of the Dimilin® 2L treated section was dramatic. The yield increase was over 35% of the non-Dimilin® 2L section. This increase was the result of more nuts and slightly larger nuts in the Dimilin® 2L section as compared to the non-Dimilin 2L section. By calculation, the mean wet weight per nut (15.7 lbs/593 nuts) was 0.027 lbs/nut in the Dimilin® 2L section while the mean wet weight per nut (17.2 lbs/750.4 nuts) was 0.024 lbs./nut in the non-Dimilin® 2L, which were statistically equivalent (Table 7). Thus, it appears that Dimilin® 2L is not acting as a growth stimulant. However, the number of nuts per tree was significantly increased by Dimilin® 2L treatment. The mean number of nuts per tree (85.7 nut weight per tree/0.027 lbs./nut) was 3,234 in the Dimilin® 2L section while the mean number of nuts per tree (61.3 nut weight per tree/0.024 lbs/nut) was 2,677 in the non-Dimilin® 2L section. Thus, it appears that Dimilin® 2L suppressed pistillate flower abscission or reduces the number of dropped immature nuts, resulting in greater crop load.

TABLE 6

Mean number and weight of walnuts

| Treatment | Rate form/ac | Mean* No. trees/trailer | Mean* wt/trailer (lbs) | Mean* weight (lbs/ac) | | | Mean* Wet nut weight/tree |
|---|---|---|---|---|---|---|---|
| | | | | Total | Wet nut | Dry nut | |
| Dimilin 2L | 8.0 fl. oz | 470.0 a | 52700.0 a | 11343.1 a | 8645.2 a | 7157.9 a | 85.7 a |
| Untreated Control | — | 573.6 b | 47774.0 b | 8443.8 b | 6168.3 b | 5212.5 b | 61.3 b |
| | F | 18.7736 | 22.0296 | 55.7271 | 17.7178 | 7.6051 | 17.7178 |
| | P | 0.0034 | 0.0022 | 0.0001 | 0.0040 | 0.0282 | 0.0040 |

*Mean followed by the same letter within a column are not significantly different using Student-Newman-Keuls test ($P \leq 0.1$)
F refers to the variation between sample means/variation within sample means.

TABLE 7

Mean number and weight of walnut samples collected

| Treatment | Rate form/ac | Total wet/ sample | Mean* weight (lbs) | | Mean* No. nuts/ sample |
|---|---|---|---|---|---|
| | | | Wet nut | Dry nut | |
| Dimilin 2L | 8.0 fl. oz | 20.6 b | 15.7 a | 13.0 a | 592.8 b |
| Untreated Control | — | 23.6 a | 17.2 a | 14.3 a | 750.4 a |
| | F | 4.4731 | 1.4108 | 0.7385 | 7.0388 |
| | p | 0.0723 | 0.2737 | 0.4186 | 0.0328 |

*Mean followed by the same letter within a column are not significantly different using Student-Newman-Keuls test ($P \leq 0.1$)

CONCLUSIONS

Thus, after the three years of experimentation with Dimilin 2L, there has been statistically significant yield increases in three studies on Tulare and Chandler walnuts.

What is claimed is:

1. A method of promoting nut yield of a nut-bearing plant, comprising contacting the nut-bearing plant or a part thereof between bud break and during early nut formation of the nut-bearing plant with N-(2,6-difluorobenzoyl)-N'-(4-chlorophenyl)urea (diflubenzuron) at a rate of from about 4 to about 16 fluid ounces per acre for a 22 wt. % concentrate of diflubenzuron, and with a blight-inhibiting fungicide composition comprising copper hydroxide, mancozeb, and zinc sulfate;
   wherein the nut-bearing plant is a walnut plant, and
   wherein the diflubenzuron and fungicide composition are applied to the nut-bearing plant in the absence of insect pressure on the plant.

2. The method of claim 1, wherein the contacting is conducted by applying the diflubenzuron and the fungicide composition to the nut-bearing plant during a time period between 5 days prior to and 5 days after a bloom period of the nut-bearing plant.

3. The method of claim 2, wherein the time period is between bud break and 100% catkin elongation, or between bud break and 100% pistillate flower bloom.

4. A method of promoting nut yield of a nut-bearing plant, comprising contacting the nut-bearing plant or a part thereof during bloom but prior to nut formation with N-(2,6-difluorobenzoyl)-N'-(4-chlorophenyl)urea (diflubenzuron)
   at a rate of from about 4 to about 16 fluid ounce per acre for an about 22 wt. % concentrate of diflubenzuron, and with a blight-inhibiting fungicide composition comprising copper hydroxide, mancozeb, and zinc sulfate;
   wherein the nut-bearing plant is a walnut plant, and
   wherein the diflubenzuron and fungicide composition are applied to the nut-bearing plants in the absence of insect pressure on the plant.

5. A method of promoting nut yield of a nut-bearing plant, comprising contacting the nut-bearing plant or a part thereof during early nut formation, with a N-(2,6-difluorobenzoyl)-N'-(4-chlorophenyl)urea (diflubenzuron)
   at a rate of from about 4 to about 16 fluid ounces per acre for an about 22 wt. % concentrate of diflubenzuron, and with a blight-inhibiting fungicide composition comprising copper hydroxide, mancozeb, and zinc sulfate;
   wherein the nut-bearing plant is a walnut plant, and
   wherein the diflubenzuron and fungicide composition are applied to the nut-bearing plant in the absence of insect pressure on the plant.

* * * * *